Patented Oct. 9, 1923.

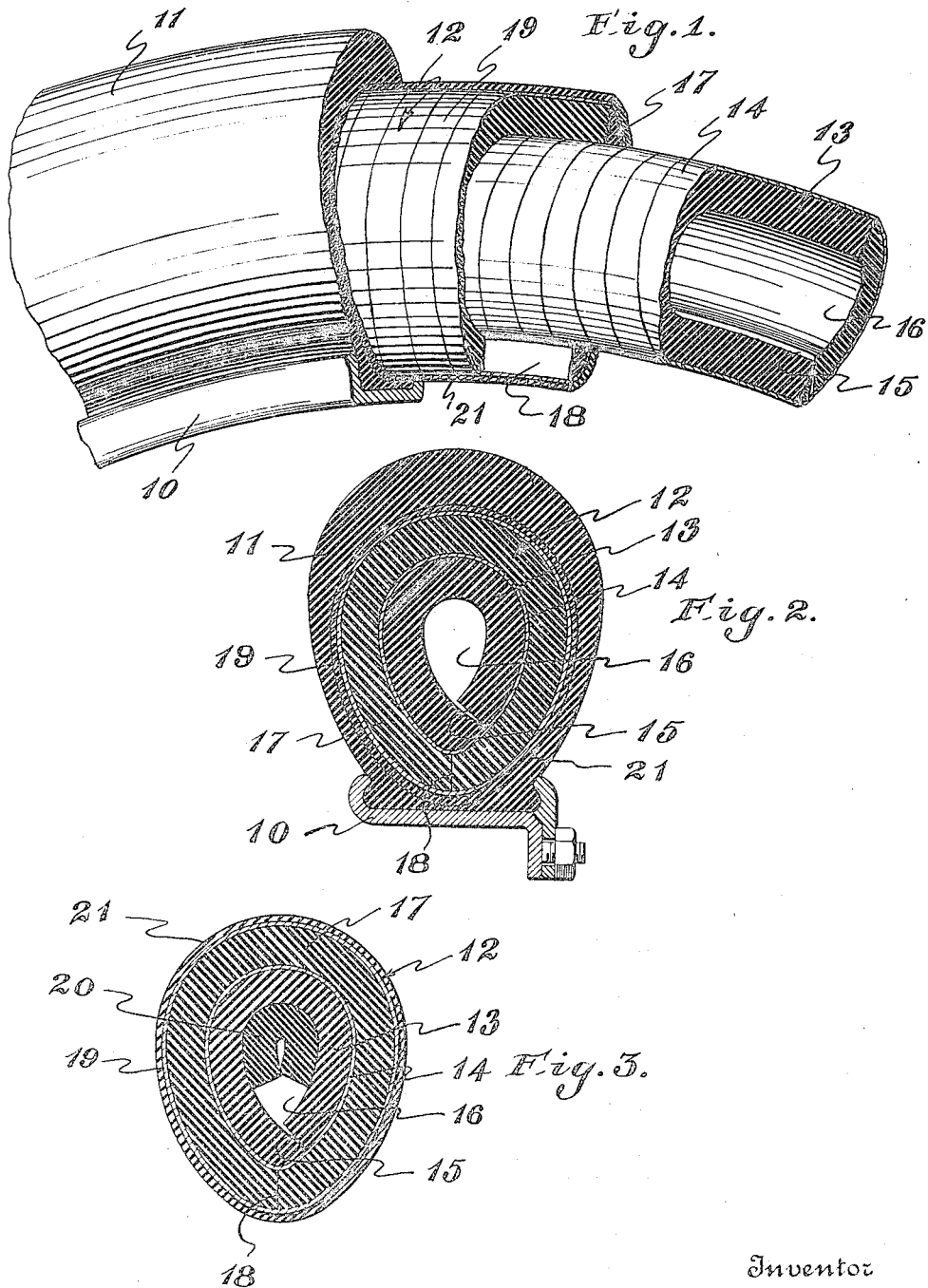

1,469,904

UNITED STATES PATENT OFFICE.

SIEGFRIED GOODMAN, OF LIVINGSTON MANOR, NEW YORK.

RESILIENT SUPPORT FOR TIRES.

Application filed February 1, 1923. Serial No. 616,229.

*To all whom it may concern:*

Be it known that I, SIEGFRIED GOODMAN, a citizen of the United States, and a resident of Livingston Manor, in the county of Sullivan and State of New York, have invented certain new and useful Improvements in Resilient Supports for Tires, of which the following is a specification.

This invention relates to improvements in tire fillers and has for its object to provide a filler or core adapted to fit within the shoe or casing of the ordinary type in order to avoid the necessity of using an objectionable inflated inner tube.

Another object of the invention is to provide a filler having all of the resiliency of the ordinary inflatable tire and which is not possessed of the drawbacks and weaknesses of the ordinary type of tire.

Still another object of the invention resides in the provision of a filler which may be made of scraps of old tires and which will retain its resiliency under all circumstances and conditions.

With the above and other objects in view, which will become more apparent as the description proceeds, the invention consists in the novel construction, combination and arrangement of parts set forth in the following specification, claimed, and illustrated in the accompanying drawing, in which:—

Figure 1 is a fragmentary view partly in section of this improved tire filler in place in a shoe or casing.

Figure 2 is a transverse sectional view through the device, showing it as used in connection with a shoe or casing of the clincher type.

Figure 3 is a transverse sectional view through a modified form of the filler showing the same as constructed for use on heavy cars.

Referring to the drawings in detail the numeral 10 designates a rim of the usual straight side construction while the numeral 11 indicates the shoe or casing.

The filler is designated in its entirety by the numeral 12 and comprises a core member 13 formed of a single strip or a series of pieces of rubber doubled as shown and bound externally with a continuous spiral winding 14 of tape or any other suitable material. As shown in Figures 2 and 3 the side edges 15 abut the inner face thereof and the whole forms a continuous cushion chamber 16 which extends throughout the interior of the filler.

Surrounding the core 13 is a strip of rubber or if so desired a multiplicity of short pieces of rubber 17 the edge or edges of which abut as at 18, and this outer element is bound tightly around the core 13 by a continuous winding 19 of a suitable tape.

If the device is to be used for light cars, it may be placed in the shoe or casing 11 and the filler will act in place of the usual pneumatic tube. Owing to the arrangement of the core 13 and its cooperating enclosing member 17, it will be seen that radial pressure on the tire will be transmitted practically through the edges of the core and enclosing elements directly to the rim, thereby giving the necessary rigidity to the tire and yet cushioning any road shocks encountered.

Where the device is to be used for heavy cars, it has been found desirable to increase the rigidity, and to this end a folded strip of rubber 20 is inserted in the space 16 in the core as illustrated in Figure 3, and obviously the restriction of the space 16 will tend to stiffen the action of the tire.

It is to be understood that when the filler is constructed of short lengths bent and bound in the manner previously set forth, that the joints or points where the pieces come together are to be staggered as for instance assuming the inner core member is made up of a plurality of relatively short lengths and the outer member 17 is constructed in the same manner, the joints between adjacent pieces of the inner member 13 would be disposed so as to fall between and not at the joints of the outer member 17.

A casing of rubber 21 is applied completely enveloping the tape windings, holding them in position and affording a smooth outer surface.

Needless to say such a method of construction would materially strengthen the whole and yet permit of the use of short lengths of scrap material.

While in the foregoing there has been shown and described the preferred embodiment of this invention, it is to be understood that minor changes in the details of construction, combination and arrangement of parts may be resorted to without departing from the spirit and scope of the invention.

Therefore what I claim as new and seek to secure by Letters Patent, is:—

1. A tire filler comprising a core member doubled longitudinally to form an ovoidal air chamber, a spirally wound binding inclosing the core member to retain the same in proper position, a core embracing member adapted to overlie the core and its binding and to completely encircle the same, and a second spirally wound binding inclosing the core embracing member to retain the same in place.

2. A tire filler comprising a hollow sectional core, a core embracing member, means surrounding the embracing means to bind the whole together, and an auxiliary sectional core element adapted to be fitted into the space within the core, the sections of said hollow and auxiliary cores being arranged in staggered relation.

3. A tire filler comprising a sectional core doubled and bound to provide a hollow body, and an outer sectional core embracing member doubled and bound around the core, the abutting edges of both members being disposed to cause the whole to conform to the shape of a casing and being arranged in staggered relation.

4. A tire filler comprising a core composed of a plurality of curved strips bent longitudinally to form an air chamber, a resilient binding inclosing the core to retain it in proper position, a core embracing member adapted to overlie the core and its binding completely encircling the same, and a resilient binding inclosing the core embracing member to retain the same in place permitting the whole to give and to rebound in action.

In testimony whereof I have signed my name to this application.

SIEGFRIED GOODMAN.